Oct. 2, 1928.
W. C. STEVENS
1,686,043
TIRE MAKING MACHINE
Filed Nov. 22, 1921   13 Sheets-Sheet 3
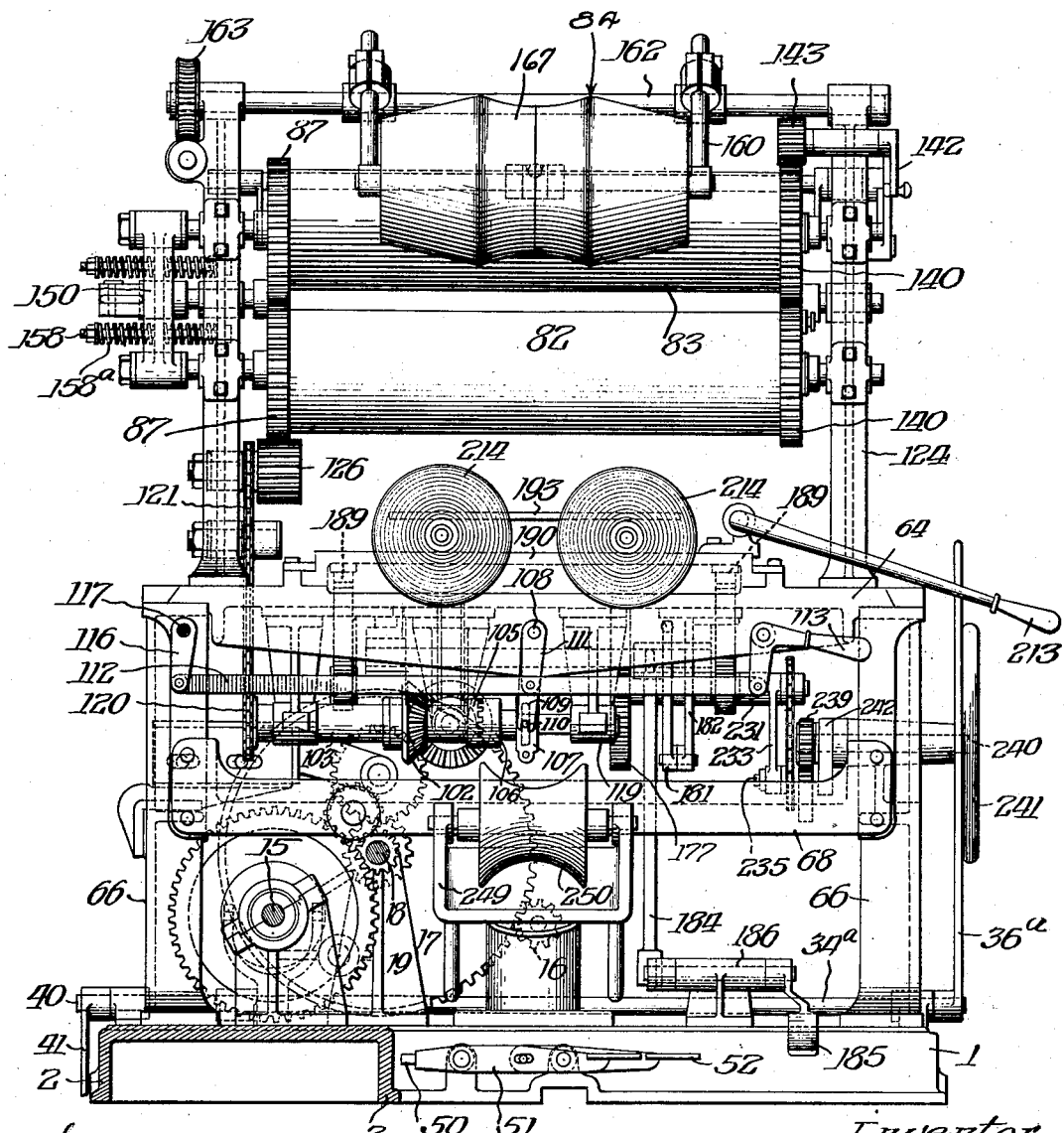

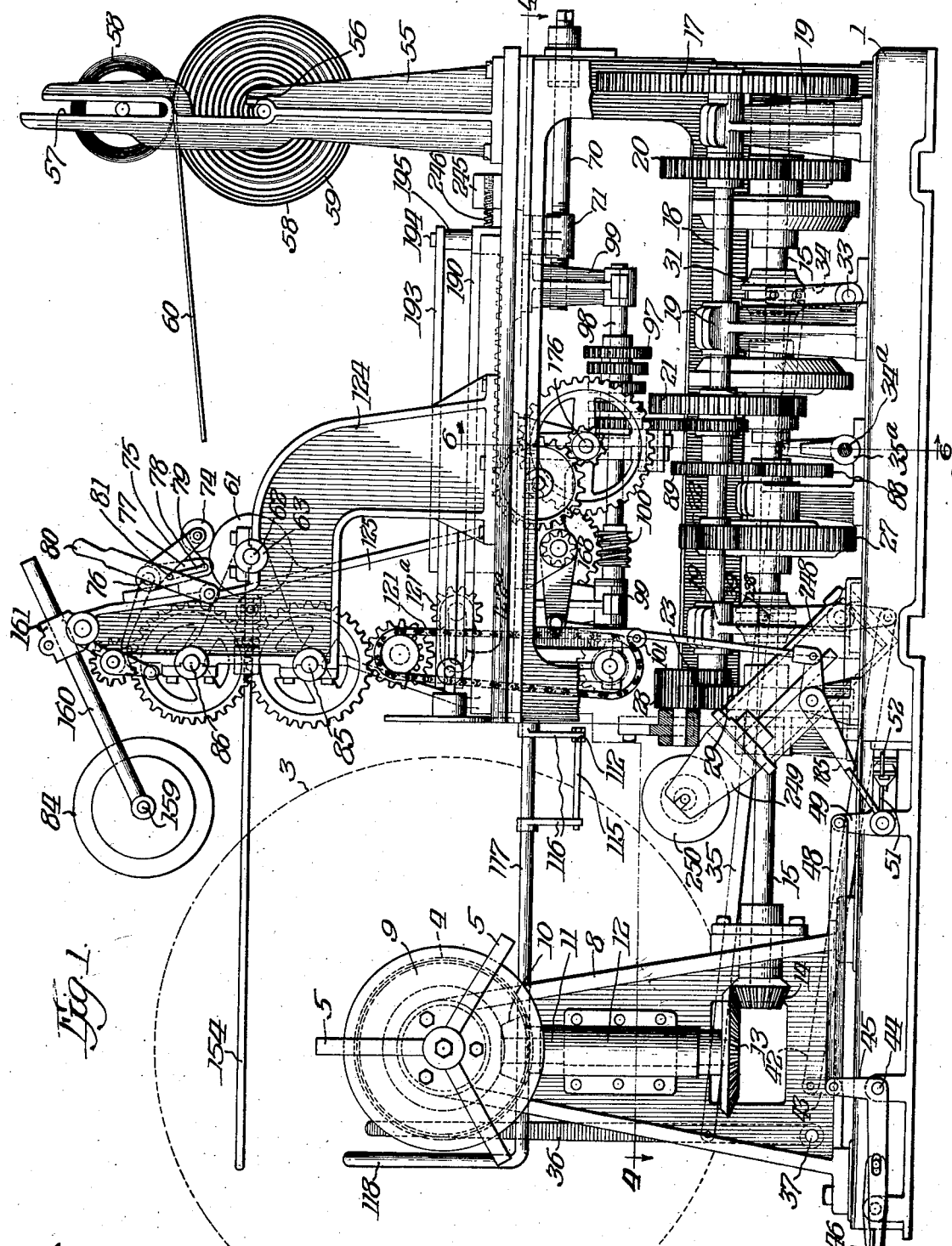

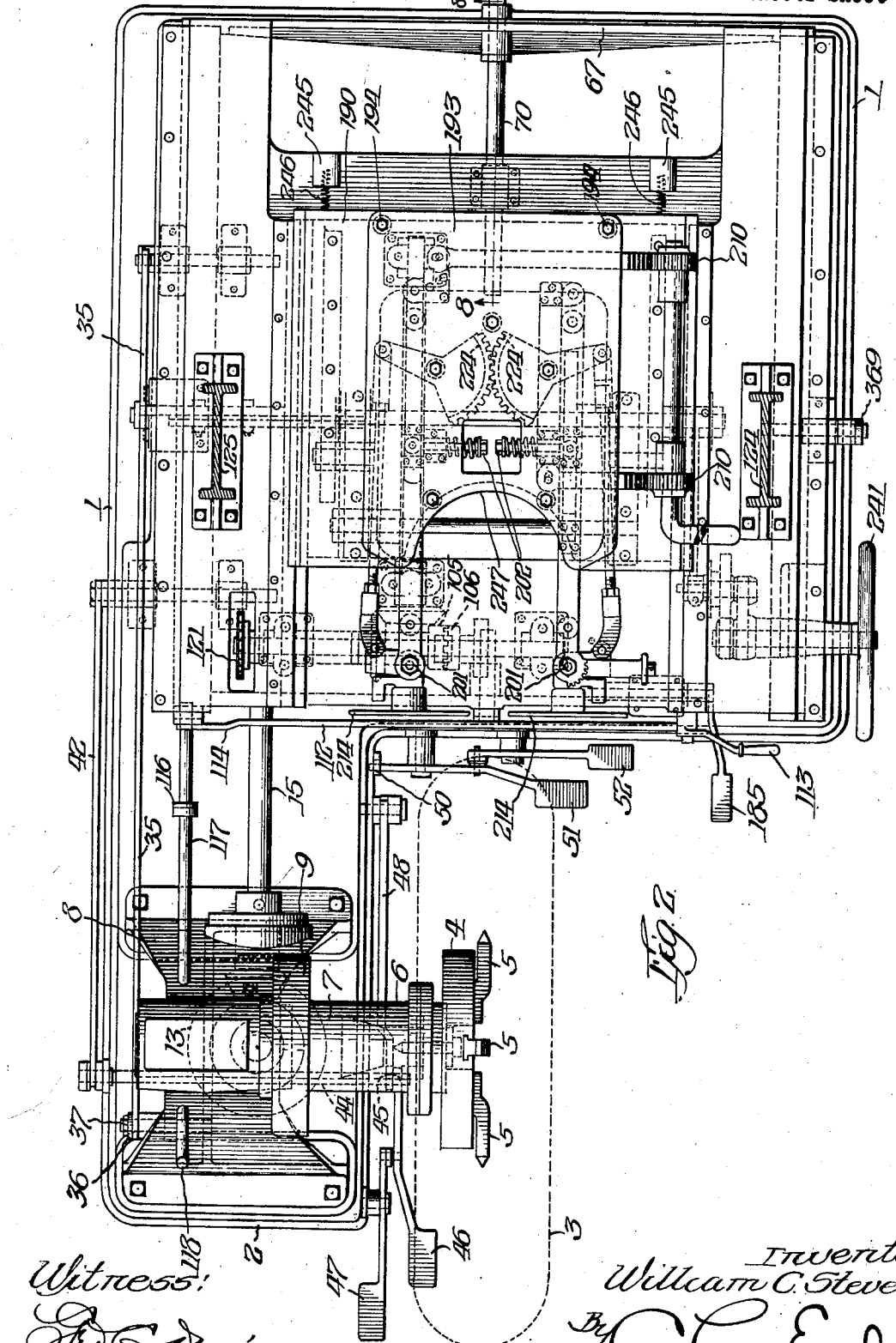

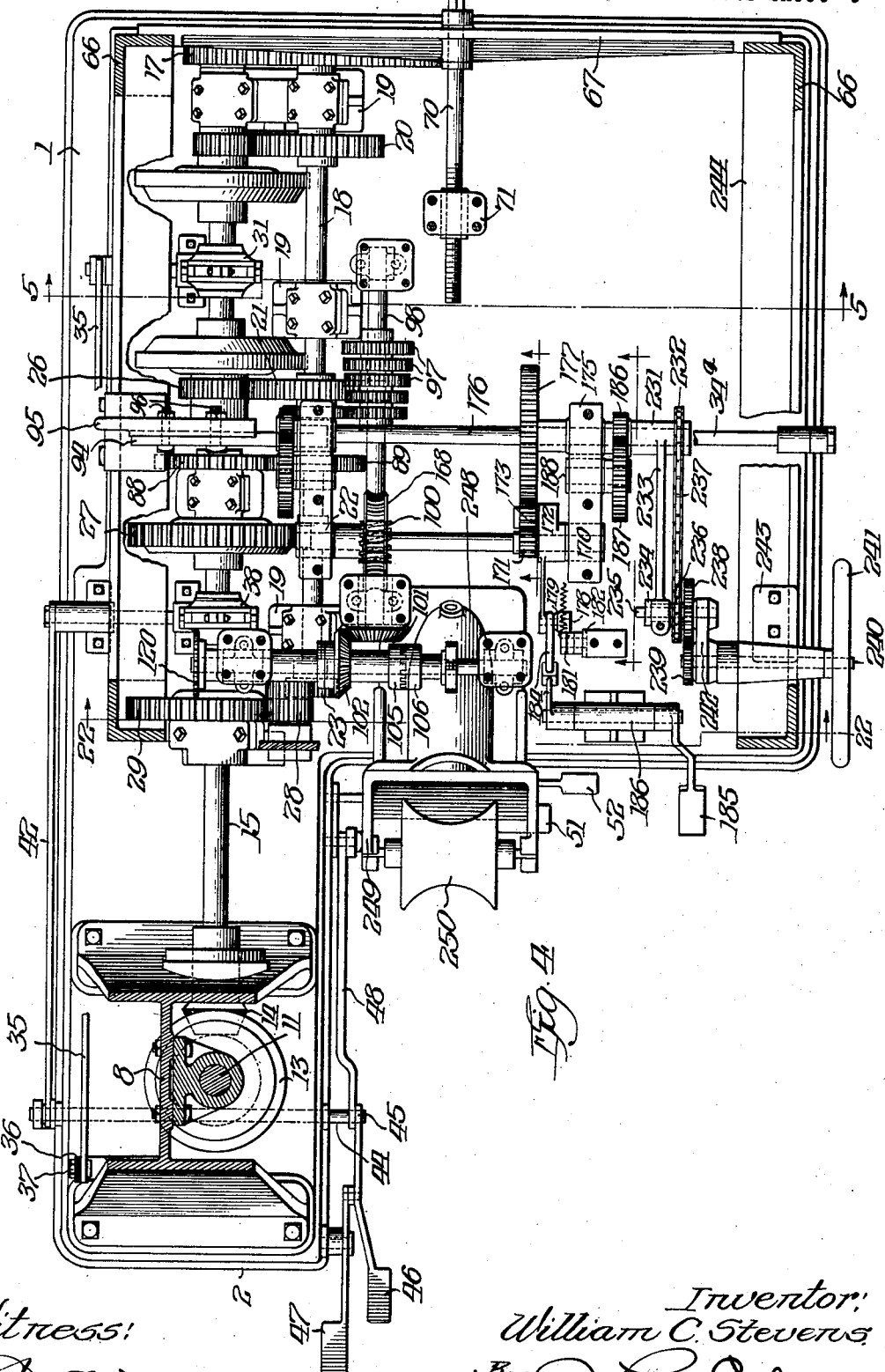

Oct. 2, 1928.
W. C. STEVENS
1,686,043
TIRE MAKING MACHINE
Filed Nov. 22, 1921
13 Sheets-Sheet 5
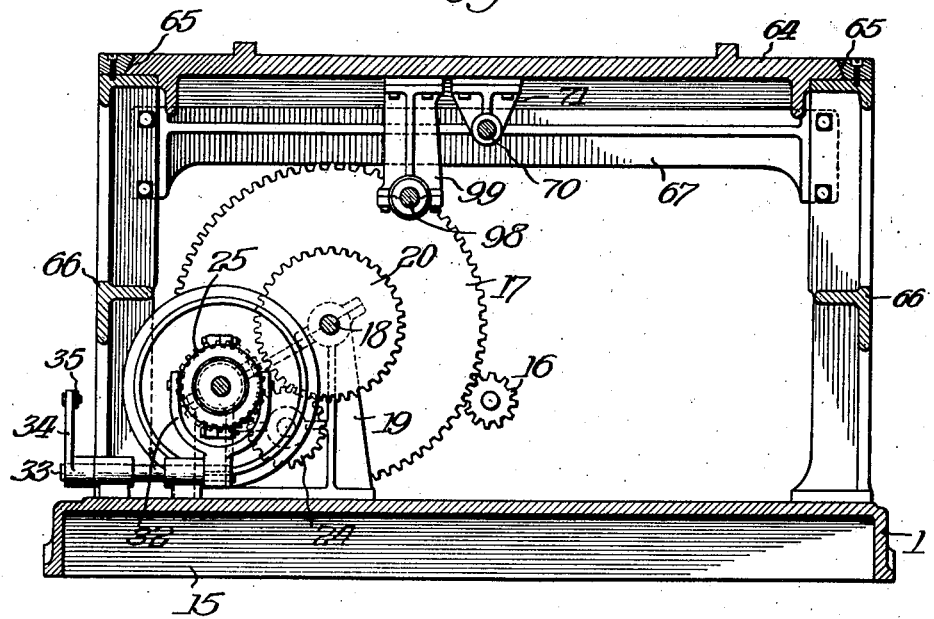
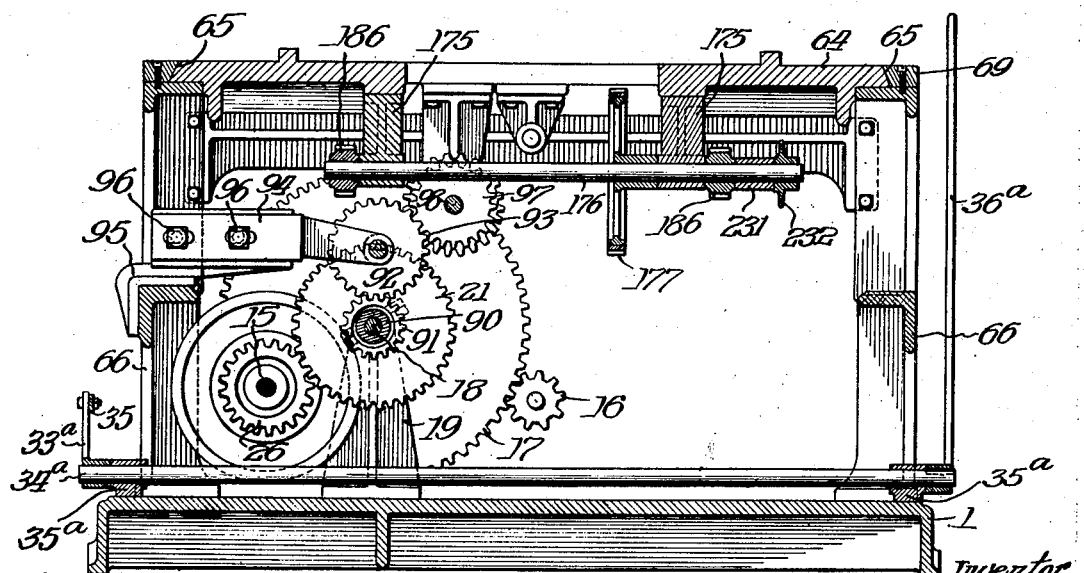

Oct. 2, 1928.
W. C. STEVENS
TIRE MAKING MACHINE
Filed Nov. 22, 1921 13 Sheets-Sheet 6
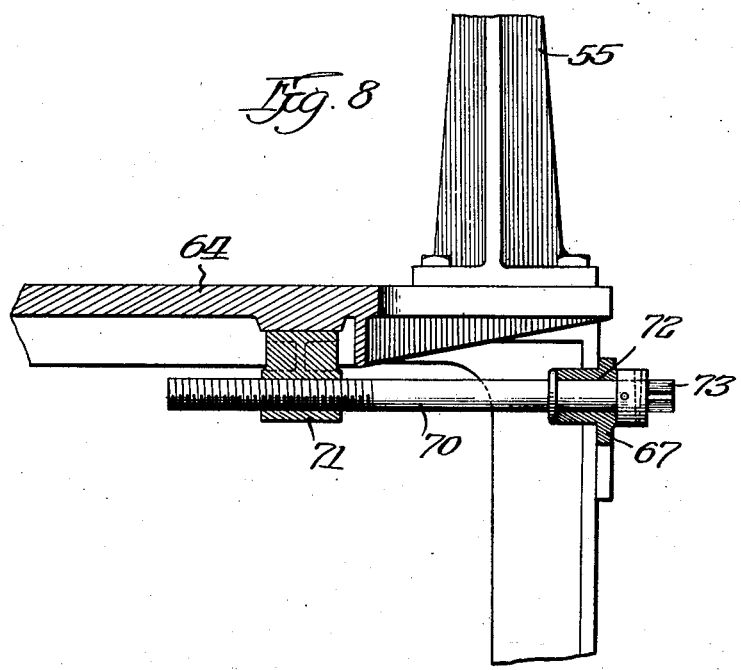
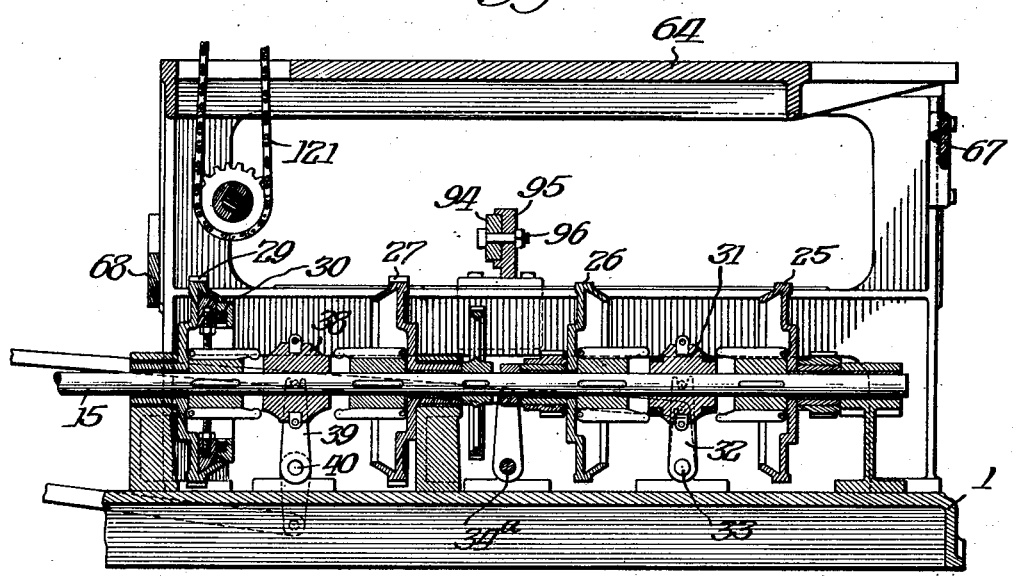

Oct. 2, 1928.
W. C. STEVENS
1,686,043
TIRE MAKING MACHINE
Filed Nov. 22, 1921
13 Sheets-Sheet 7
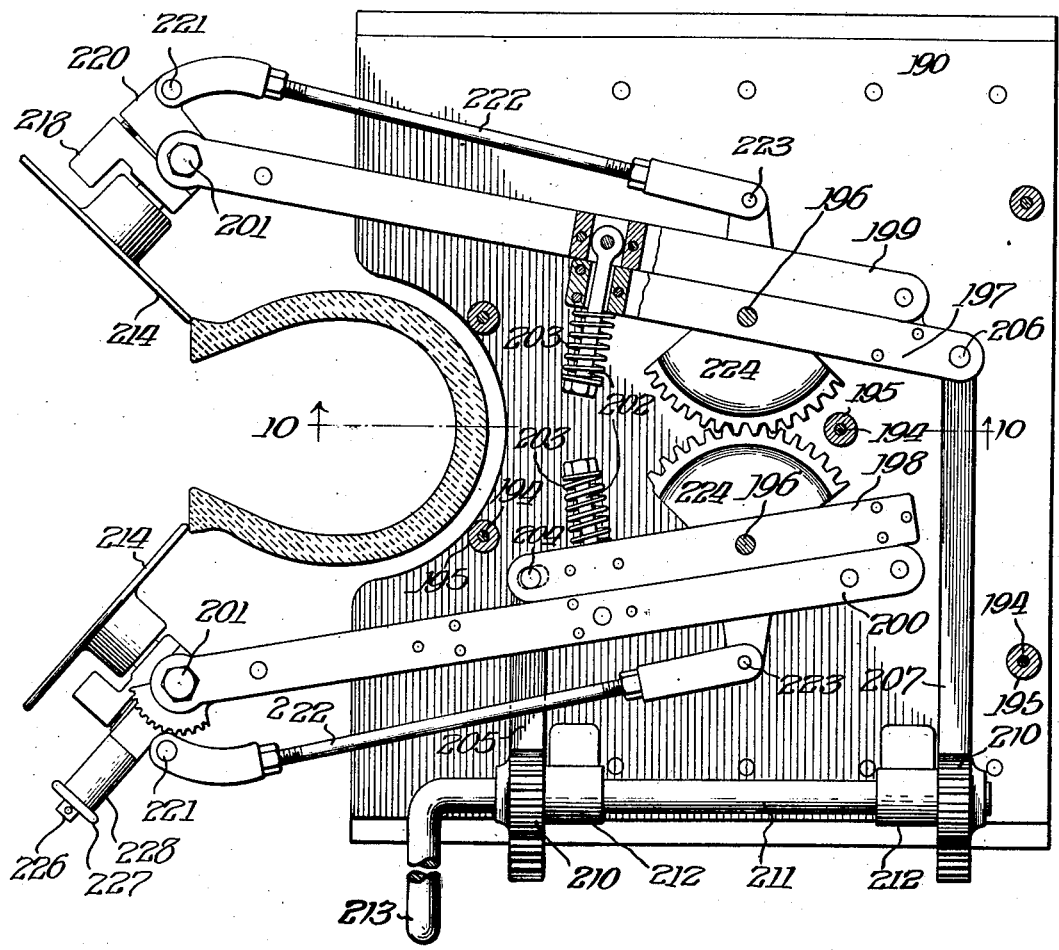
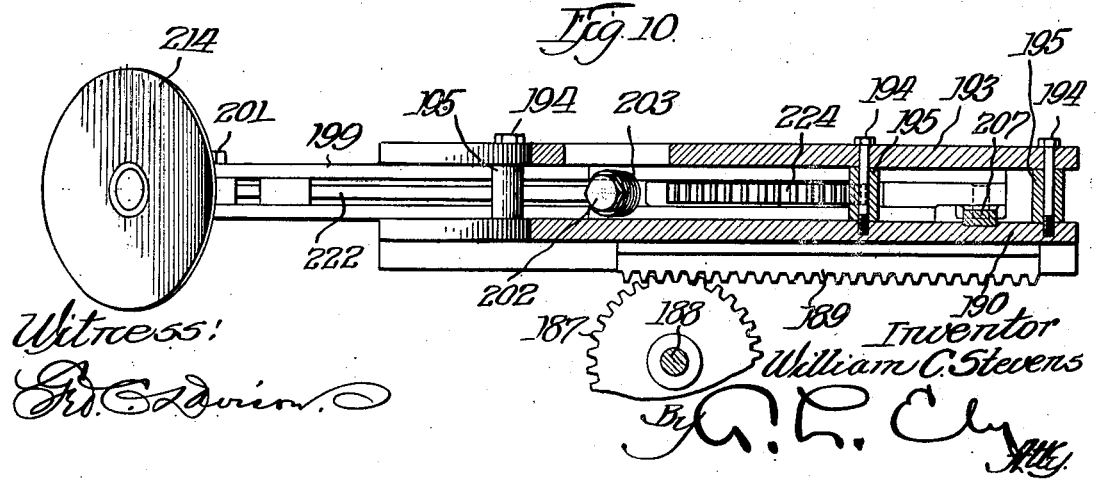

Oct. 2, 1928.
W. C. STEVENS
1,686,043
TIRE MAKING MACHINE
Filed Nov. 22, 1921
13 Sheets—Sheet 8
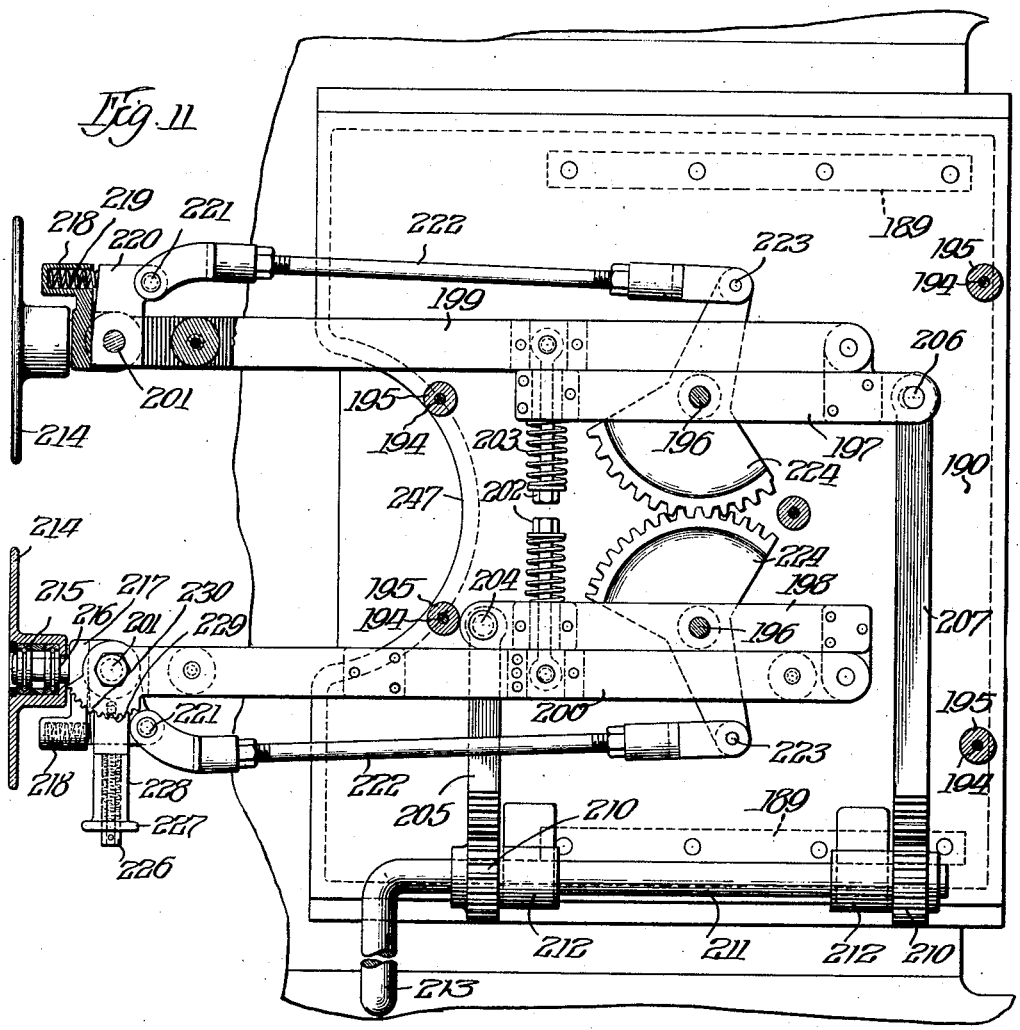
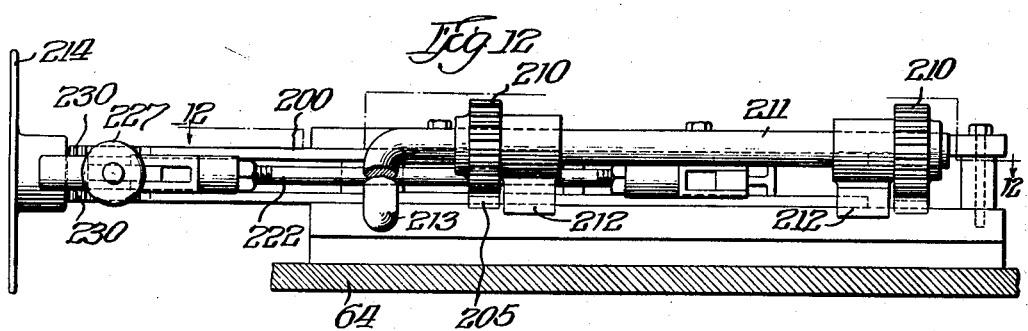
Witness:
Inventor
William C. Stevens Oct. 2, 1928.  
W. C. STEVENS  
TIRE MAKING MACHINE  
Filed Nov. 22, 1921
1,686,043
13 Sheets-Sheet 9
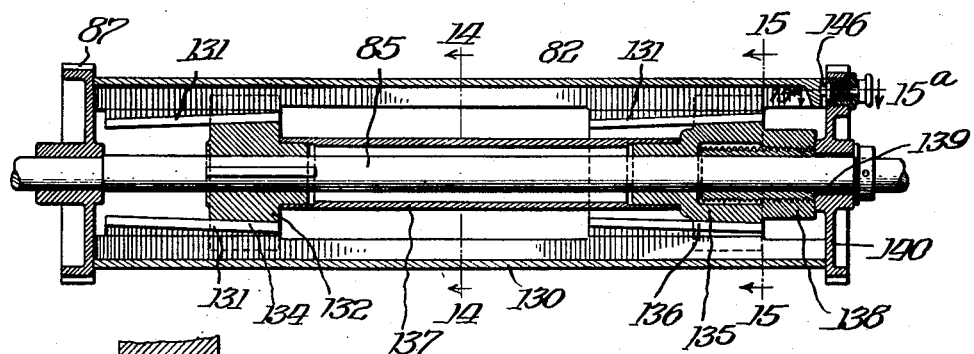
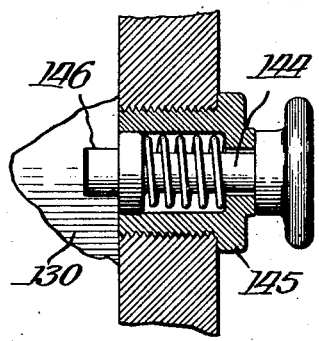
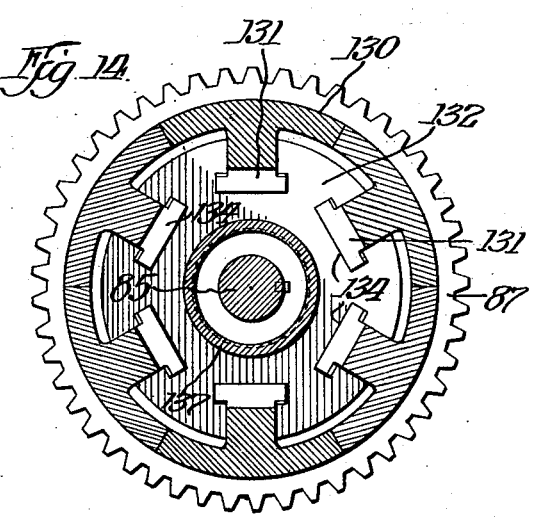
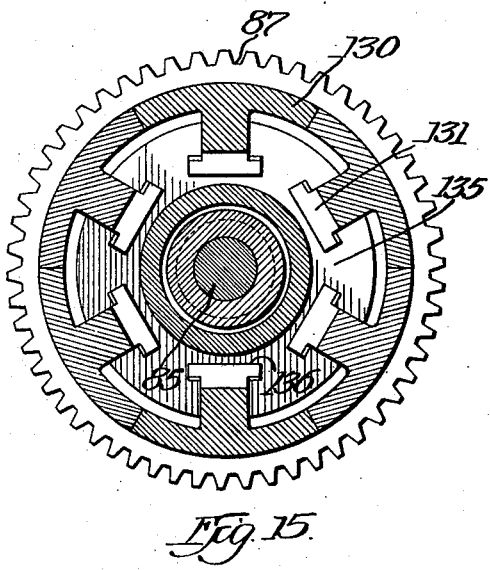
Witness:  
Inventor  
William C. Stevens

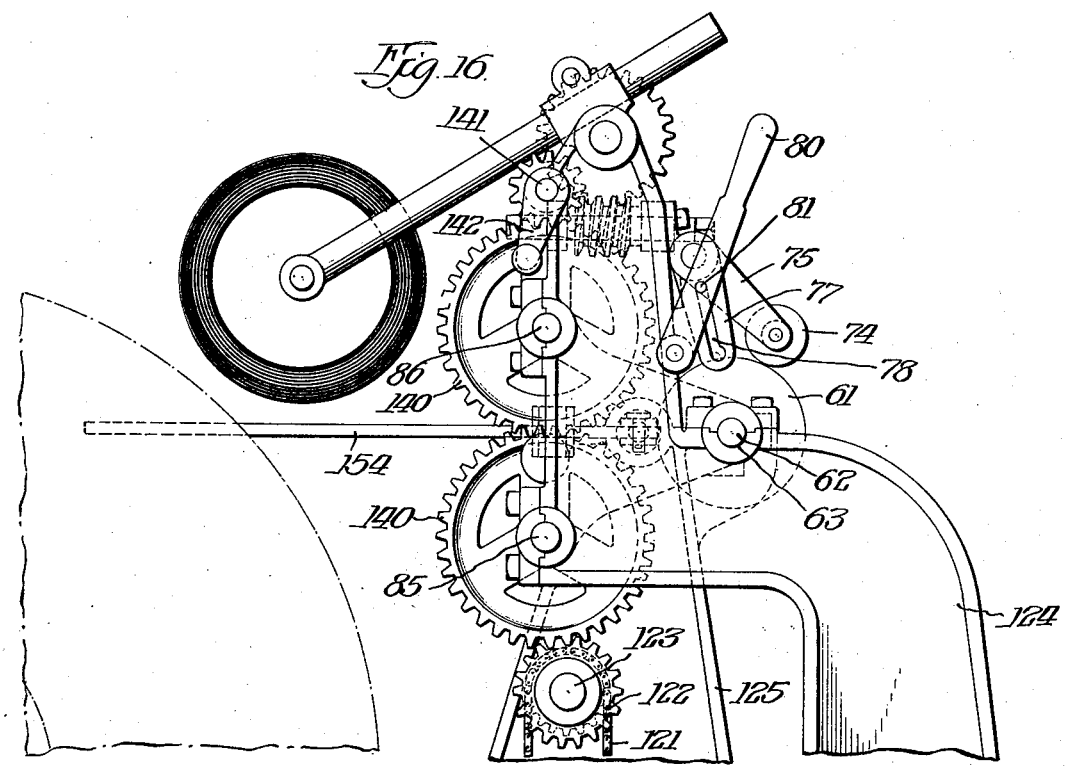
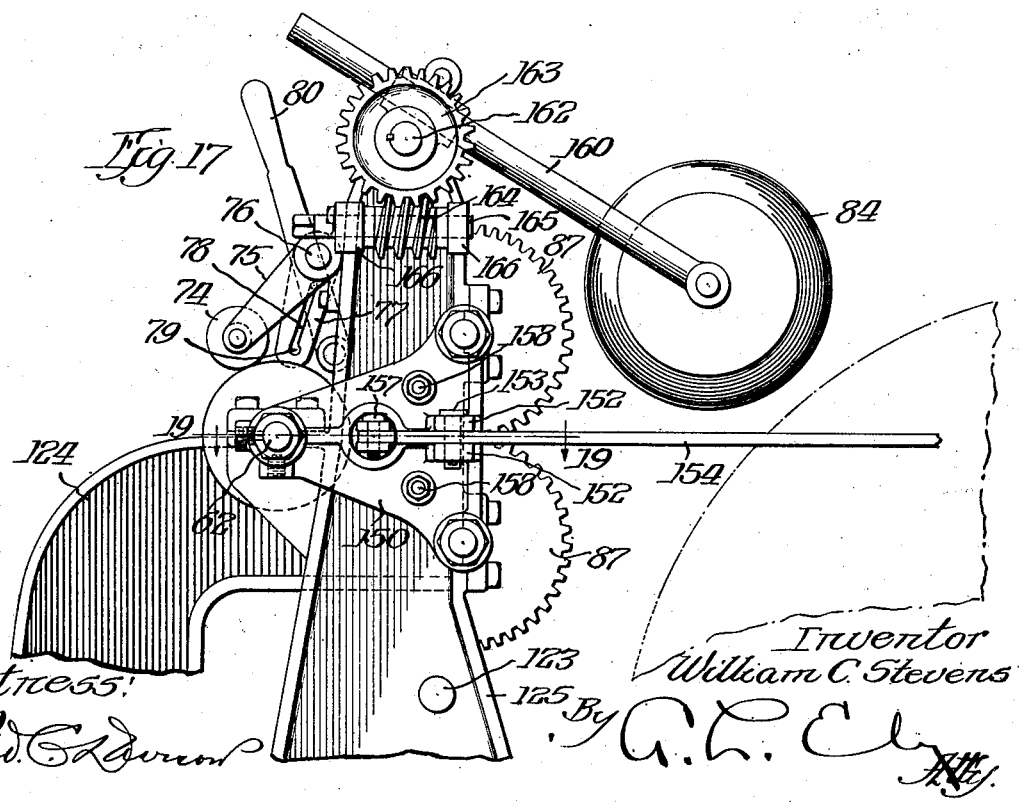

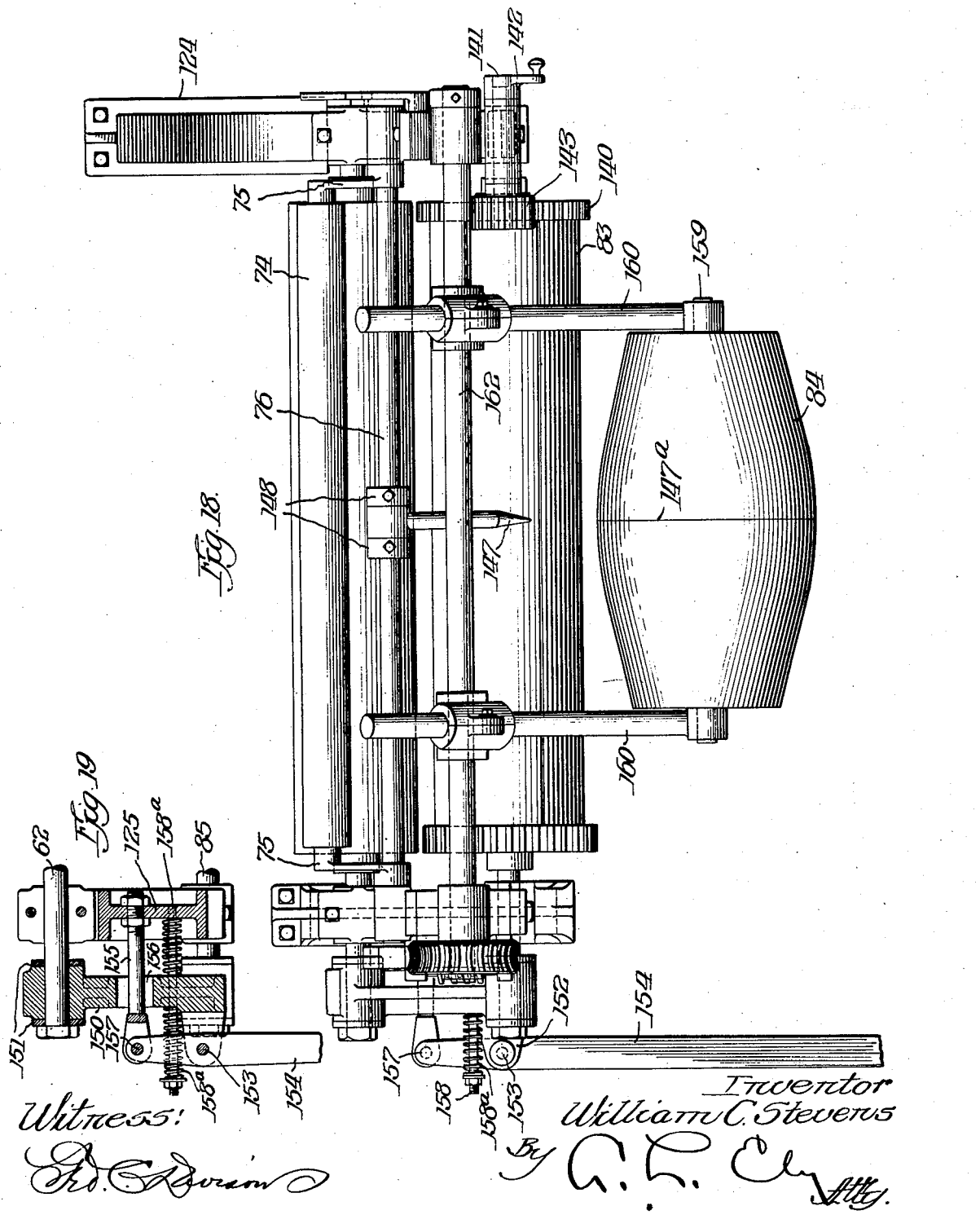

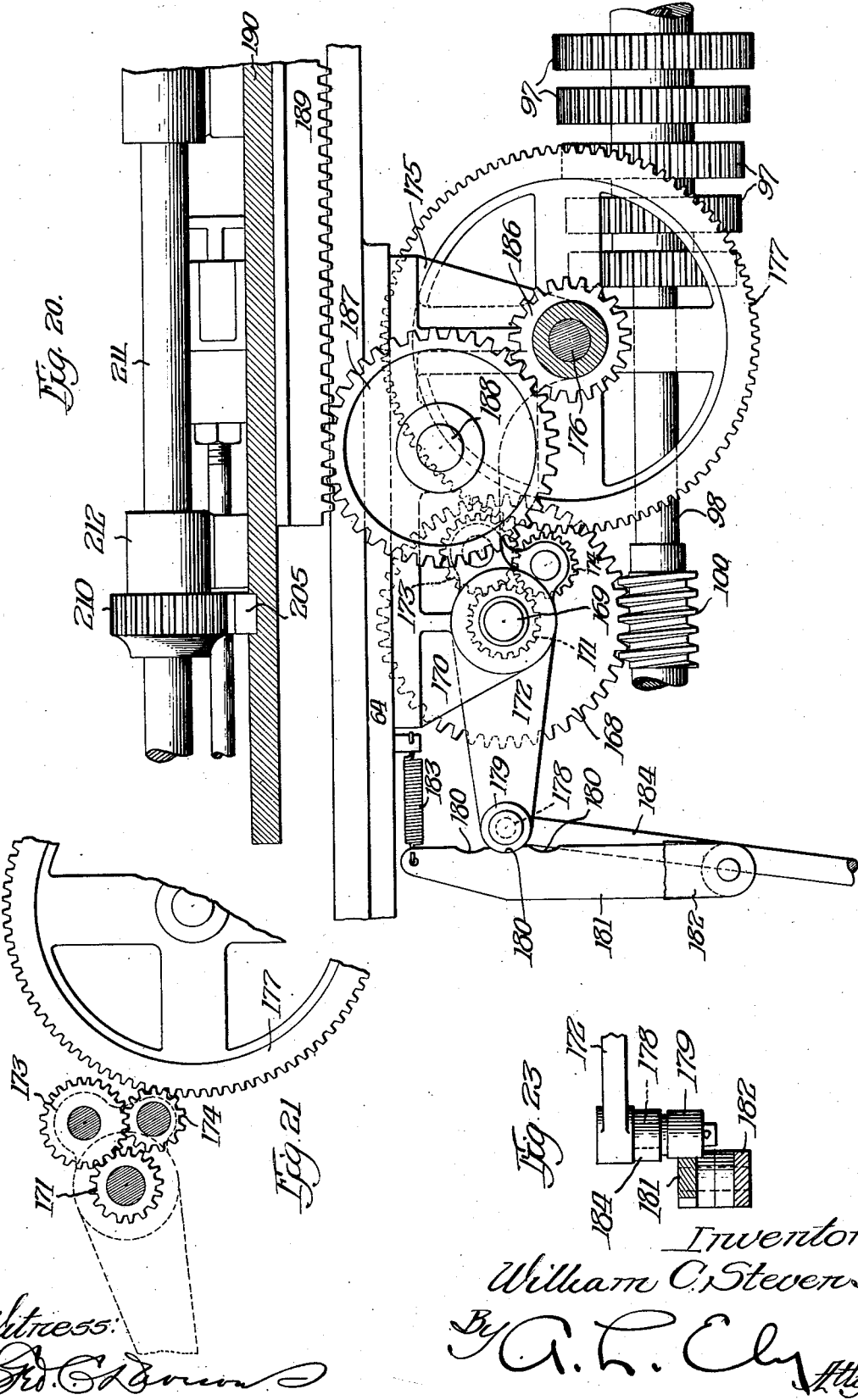

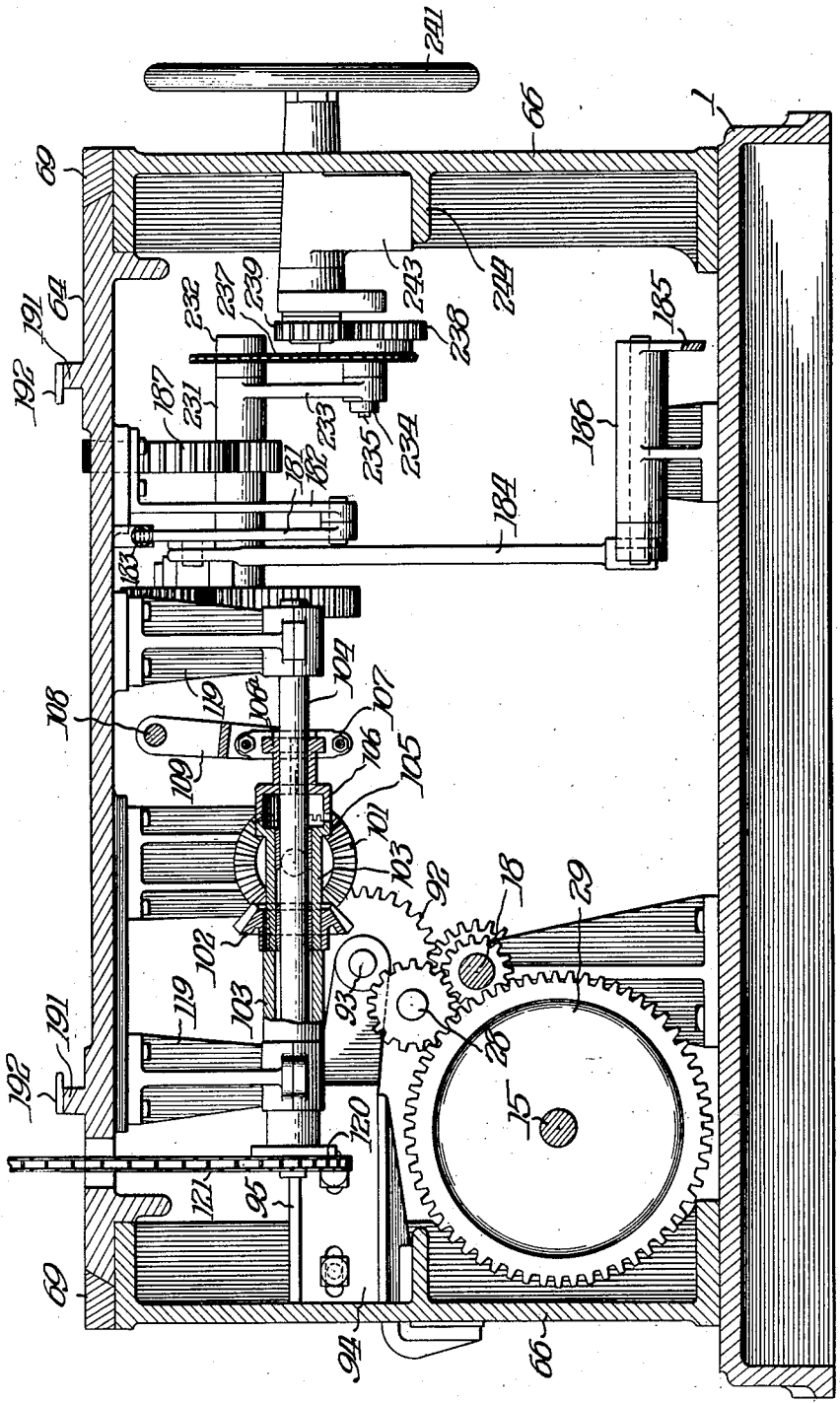

Patented Oct. 2, 1928.

1,686,043

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-MAKING MACHINE.

Application filed November 22, 1921. Serial No. 517,010.

The invention relates to machines for the manufacture of pneumatic tires, such as used on automobiles, trucks or similar vehicles, and the object of the invention is to produce a machine for the purpose of laying up or shaping the various elements of a tire about the core, the machine being capable of laying up the layers of fabric which make up the carcass of the tire and for applying the rubber tread, sidewalls and other elements of the tire.

The machine is particularly designed for the manufacture of tires of large cross section in which there are used a large number of plies of fabric and it is so constructed that a uniform stretch may be given to the various layers of fabric irrespective of their position in the tire, the machine being provided with adjustable devices by which the stretch may be maintained uniform in the several plies. The machine is also designed and intended for building up a large variety of sizes of tires, being provided with adjustable regulating devices by which it can be set to manufacture tires of several sizes.

The machine is also designed to be very flexible in its operations so that it can be used by the tire builder in all of the building operations incident to the manufacture of automobile tires. Heretofore, as far as known to me, the manufacture of large pneumatic tires by which is intended to be meant tires from 6 to 10 inches or larger in cross section, as used upon trucks or other heavy vehicles, has been confined to hand building. By the machine however, the building of these large tires may be well and accurately done, the work being more rapid and accompanied with less physical exertion on the part of the operator. As a result better and more economical production is obtained.

In this application there is shown and described one form of my improved tire building machine, and it will be understood that the showing is for the purpose of enabling one skilled in the art to practice the invention and is not for the purpose of limiting the invention to exactness in form; proportion or location of the parts. Variations and modifications may be made, without departing from the invention or sacrificing any of its benefits.

In the drawings:

Fig. 1 is a side elevation of the tire building machine of the invention.

Fig. 2 is a plan view, the fabric tensioning and feeding head being removed.

Fig. 3 is a front elevation taken in the rear of core holding stand.

Fig. 4 is a horizontal section on the line 4—4 of Fig. 1.

Fig. 5 is a vertical section on the line 5—5 of Fig. 4.

Fig. 6 is a vertical section on the line 6—6 of Fig. 1.

Fig. 7 is a longitudinal vertical section along the main drive shaft.

Fig. 8 is a section on the line 8—8 of Fig. 2.

Fig. 9 is a plan view of the stitchers or spinning rollers, in position to shape the fabric about the beads.

Fig. 10 is a longitudinal section on the line 10—10 of Fig. 9.

Fig. 11 is a plan view of the stitchers in another position.

Fig. 12 is a side elevation of the parts shown in Fig. 11.

Fig. 13 is a longitudinal section through a tension roller.

Figs. 14, 15 and 15$^a$ are cross sections on the lines 14—14; 15—15; and 15$^a$—15$^a$ of Fig. 13.

Fig. 16 is an enlarged elevation of the tension rolls.

Fig. 17 is an elevation of the tension rollers looking in the opposite direction from Fig. 16.

Fig. 18 is a plan view of the tension rollers.

Fig. 19 is a section in the line 19—19 of Fig. 17.

Fig. 20 is an elevation of the driving mechanism for advancing the stitchers or spinning rolls over the core.

Fig. 21 is a view showing the mechanism reversed.

Fig. 22 is a section on the line 22—22 of Fig. 4.

Figure 23 is a sectional detail of a portion of the machine shown in Fig. 20.

The machine of this invention comprises a core holding and revolving stand, a fabric feeding and stitching device, spinning rollers for shaping the fabric and rubber to the side of the core, and a tread rolling device for rolling the rubber tread on the carcass of the tire and these several parts will be described in the order named.

Core holding and revolving stand.

The machine comprises a base plate 1 which supports the several parts of the machine, and which is substantially square with an extension 2 from one corner thereof which furnishes the mounting for the core. 3 indicates a core which may be of any cross section, the machine shown here being designed to operate upon cores from 6 to 10 inches in cross section, although it is not limited to these sizes.

The core is mounted upon a chuck 4 having expansible arms 5 which grip the inner periphery of the core. This chuck may be of any suitable design and is secured to the face of a sleeve 6 which is rotatably mounted on the projecting end of a spindle 7, that is carried in the upper end of standard 8, secured to the extension 2. The rear end of the sleeve 6 is formed with a bevel gear 9 which meshes with a bevel pinion 10 on the upper end of a shaft 11, which is rotatably mounted in a bearing 12, secured to the standard 8. The lower end of the shaft 11 is attached to a bevel gear 13 which meshes with a bevel pinion 14 on the end of a core drive shaft 15, the front end of which is supported for rotation in the standard 8 and the center portion and rear of which are supported in various brackets and standards rising from the base plate as shown in Fig. 7.

Power is derived from any suitable source here indicated as a motor pinion 16 which meshes with a large gear 17, secured to the end of a main drive shaft 18, that is mounted for rotation in brackets 19 rising from the platform. The core is designed to be rotated at fast and slow speed in both directions and to accomplish this result the main drive shaft is provided with two large pinions 20 and 21 and two small pinions 22 and 23. The pinion 20 meshes with an idler 24 which in turn meshes with a gear 25 mounted on the shaft 15 (Fig. 5). The pinion 21 meshes directly with a pinion 26 on the shaft 15. The pinion 22 meshes with a gear 27 on the shaft 15 and the pinion 23 meshes with a long idler 28, which in turn meshes with a gear 29 on the shaft 15.

The several driven gears 25, 26, 27, and 29 are not secured to the shaft 15 directly but are each carried on a clutch member as shown in Fig. 7. Of these clutches only one is shown in detail in this figure it being understood that the clutch devices are similar on each member. The two high speed gears 25 and 26 are arranged to be connected to the shaft 15 so as to rotate the core in either direction by the core 31 which is shifted to the right or left by means of a spanner arm 32 connected to a rock shaft 33, which carries an operating lever 34.

The lever 34 is pivoted to a long link 35 which extends to a point adjacent the core where it is connected to a hand lever 36 pivoted at 37 to the standard 8. At a convenient point the link 35 is pivoted to a lever 33$^a$ which is attached to a shaft 34$^a$ mounted in bearings 35$^a$ on the base of the machine and extending to the opposite side of the framework at which point it has secured a hand lever 36$^a$. This arrangement is provided so that the driving power for the fast speed may be regulated from the right hand side of the machine.

The two low speed gears 27 and 29 are arranged to be connected to the shaft 15 to rotate the core in either direction by a cone 38 which is shifted along the shaft 15 by a spanner 39 carried on a rock shaft 40. The end of the shaft 40 which projects over the base plate carries a lever 41 to which is connected a link 42, which is in turn pivoted to a crank arm 43 secured to a transverse shaft 44 mounted in the extension 2, below the core. In front of the extension the shaft 44 carries a bell crank lever 45 one end of which is extended forward to provide a treadle 46. To the treadle 46 is connected a second treadle 47 pivoted on the extension and so arranged that by stepping on either treadle 46 or 47 the clutch may be shifted so that the core may be rotated slowly in either direction. In order to provide additional operating means for operating the core at slow speed in either direction the bell crank 45 is connected to a link 48 in turn connected to a bell crank 49 pivoted on the base, the other end of which lever engages a pin 50 extending from a pivoted foot lever 51. This lever is connected to a second pivoted foot treadle 52 so that by pressure on either lever the core may be rotated in either direction.

As a summary of the core rotating means, it will be noted that it may be revolved at high speed in either direction by the manipulations of the hand lever 36 or 36$^a$ and at slow speed in either direction by the foot treadles 46, 47, 51 and 52. The high speed is used during the majority of the spinning operations which are done by the machine, while the low speed may be used in certain of the machine operations where the work must be done more slowly and carefully, and in the hand operations of finishing the tire. The slow speed is also used in the application and stretching of the fabric. It will be noted that the treadles 46 and 47 are at the rear of or back of the core, while the treadles 51 and 52 are in front of the core. As a result of this construction the operator can work on either side of the tire and can operate the slow speed core revolving mechanism without interfering with hand operations. As a result of this arrangement a very flexible and easily operated machine is obtained.

Fabric feeding and stretching mechanism.

The fabric for a single tire is usually made up complete in a single roll provided with the usual liner for which there is furnished a bracket 55, at the rear of the machine, the bracket having a bearing 56 for the roll of stock and liner 58 and a bearing 57 for the liner roll 59. The fabric, indicated by the numeral 60 passes from the roll 58 to an idler roll 61 secured on a shaft 62 slidably mounted in bearing 63, on the upper surface of a curved overhanging bracket 124.

The brackets 124 and 55 are attached to a plate 64, which is slidably mounted in ways 65 formed on the upper surfaces of uprights or legs 66 which are secured to the base 1 and braced by a rear tie piece 67 and a front tie piece 68. Rails 69 hold the sliding plate 64 in place and the plate is adjusted forwardly and backwardly to accommodate different sized cores by a screw shaft 70 which engages a nut 71 depending from the under side of the plate 64 and a bearing 72 in the rear tie piece 67. A squared head 73 is formed on the end of the shaft 70, by which it may be operated to adjust the location of the table or sliding bed plate 64.

Returning now to the fabric, it will be noted that as the stock reaches the roll 61 it passes under a weight roll 74 which rests on the roll 61 being supported in a pair of arms 75 attached to a shaft 76 rotatably mounted in bearings on the brackets 63. The shaft 76 is provided with a depending arm 77 in which there is a slot 78 provided with an enlarged opening 79 at its lower end. On the bracket 124 is pivoted a lever 80 at a midway point of which is a pin 81 which engages the slot 78. When the lever 80 is depressed, the pin 81 will raise the weight roller and at the upper limit of movement the pin passes into the enlargement 79 and the roll is locked in raised position.

From the roll 61 the fabric passes around a tension roller 82 and over a tension roller 83 from which it passes under a spreading roller 84 to the core. The roller 82 is secured to a shaft 85 and the roller 84 to a shaft 86 both of which are rotatably and slidably mounted in bearings in the bracket 124. The shafts and rollers are interconnected by gears 87 at the left side of the rollers as viewed in Fig. 3. The rollers 82 and 83 are intended to give the required stretch to the fabric as it passes to the core and to accomplish this purpose the rollers are rotated at a definite less peripheral speed than the speed of the core, by interconnected driving mechanism with the core rotating means.

The shaft 15 is provided with a gear 88 which meshes with a gear 89 carried on a sleeve 90 rotatably mounted on the shaft 18. The sleeve 90 carries a spur gear 91 which drives an intermediate gear 92. The gear 92 is carried on a shaft 93 which is supported on a longitudinally adjusted arm 94. The arm 94 is slidably mounted in a bracket 95 supported on one of the uprights 66 and secured in adjusted position by nuts 96.

The gear 92 is intended to mesh with any one of a plurality of differential gears 97, each gear being intended for use in the manufacture of a given size tire. The gears 97 are secured to a shaft 98 mounted in brackets 99 depending from the under side of the sliding plate or table 64, and are therefore movable with the table.

From this construction it will be seen that as the table or bed plate 64 is moved to bring the tension rollers toward and away from the core axis for the different size cores, the proper gear of the group 97 will be brought in line with the gears 92 and 91, the gear 92 being adjusted to proper position by regulation of the arm 94. The change in gearing is necessary to regulate the speed of the tension rollers, which are driven through the gears in definite relation to the rotary or axial speed of the core, it being evident that as the size of the tire increases its peripheral speed will increase and such regulation is necessary to take care of the different circumferences of tires which the machine is adapted to build. In the particular showing the gears are five in number intended for building tires of 6, 7, 8, 9 and 10 inch cross section, the gears being arranged in the order named from the right to the left, by which it will be seen that as the machine is shown in the drawings the smallest gear of the set is in mesh, the bed plate 64 is set at its extreme position away from the axis of the core, in position to manufacture a 10 inch tire. Of course the number and size of the gears is not limited to those shown, but as the periphery of the core increases the size of the gear 97 decreases, whereby the speed of rotation of the tension rolls is increased to compensate for the increased periphery of the tire.

The shaft 98 carries a worm 100 for driving the stitching rollers and a bevel gear 101 at its forward end for driving the tension rollers. The gear 101 meshes with a bevel gear 102 secured midway on a sleeve 103 rotatably mounted on a shaft 104. The right hand end of the sleeve 103 is formed with a clutch member 105 and slidably keyed on the shaft 104, is a clutch member 106, a flange 106$^a$ on which is received in a ring or collar 107. Secured to a shaft 108 in the front face of the bed plate 64 is a spanner arm 109, the lower end of which engages pins 110 on the collar 107. The shaft 108 has attached a lever arm 111 which is pivoted at its lower end at a midway point on a long bar 112 which extends across the front of the machine. The bar is pivoted at the right side of the machine as viewed in Fig. 3 to an angular operating lever 113 pivoted to the front face of the bed plate 64. At the other end the bar is bent outwardly slightly as shown at 114 in Fig. 2 and is slidably mounted on a rod 115 between two hangers 116 depending from a shaft 117, the inner end of which is pivoted in the framework 66 and the outer end of which is journalled in the standard 8 and is provided with an angular operating extension 118. By the provision of the two levers 113 and 118 the operator can shift the clutch 106 from either side of the core, whereby the tension rollers can be made operative in either position in which he stands. This makes an easy and convenient method of operating the device. The sliding mounting of the bar 114 makes possible an adjustment of the bed plate without disturbing the lever 118.

The shaft 104 is supported in hangers 119 from the underside of the bed plate 64 and is provided at one end with a sprocket 120, over which passes a sprocket chain 121 which is received over a sprocket 122 on a shaft 123. An idler 121$^a$ adjustably mounted in a slot 122$^a$ may be utilized for maintaining tension on the chain.

From the bed plate 64 rise two standards 124 and 125 which support the tension rollers which give the required stretch to the fabric as it passes to the core. The front standard 124 is formed as a goose neck to provide open operating space beneath it for manipulation of the spinning rollers, while the standard 125 is upright. The shaft 123 previously described is rotated in the standard 125, and carries an elongated gear or pinion 126 which meshes with the gear 87 on the lower tension roller 82.

By the mechanism which has been described, it will be seen that as different sized cores are mounted on the chuck the bed plate 64 is adjusted to bring the fabric feeding and tension rolls in proper relation to the core, which action at the same time brings the proper gear 97 in line with the driving gears 91 and 92, so as to adjust the peripheral speed of the core to the speed of the tension rolls, to provide a substantially uniform degree of stretch to the fabric. This adjustment may be termed a basic adjustment for different size tires, but it does not provide for the increasing circumference of the core as the fabric is laid thereupon, which adds another variable element to the stretch of the fabric. In order to take care of this variable element, I have provided means by which the amount of fabric delivered by the tension rollers may be varied to accommodate the difference in position of the several layers.

In order to accomplish this purpose I provide means by which the circumference of the tension rollers may be varied. The lower tension roller 82 is shown in detail in Figs. 13 to 16 inclusive, and as both rollers are of substantially similar construction, the description of the roll only will be detailed.

This roll is composed of a plurality of arc shaped segmental plates, 130, which, when assembled make the complete roll, there being shown here six plates in all to make the complete circumference. To the under surface of each plate at spaced points, are secured two separate, similarly placed tapered wedge pieces 131. At one end of the shaft 85 is slidably mounted and feathered an expanding cone 132, the surface of which is provided with a number of tapered recesses 134 to receive the wedge pieces 131. At the other end of the shaft 85 is slidably mounted and feathered a second expanding cone 135, the surface of which is provided with similar tapered recesses 136 to receive the wedge pieces 131, at that end of the roll. The two cone pieces 132 and 135 are secured together in proper spaced relation by a sleeve 137.

The cone 135 is provided with a reduced, internally screw-threaded extension 138 which engages with a screw-threaded sleeve 139 rotatably mounted on the shaft 85 and received in an enlargement in the cone 135. To a forwardly reduced extension on the sleeve 139 is secured a gear 140. As the gears 140 rotate in opposite directions the sleeve 139 has a right hand thread on one of the rolls and a left hand thread on the other.

The operation of the parts just described is as follows: If the gear 140 is rotated relatively to the shaft 85, the rotation of the screw-threaded sleeve 139 will move the two expanding cones 132 and 135 along the shaft, which action serves to move the several segments of the tension rolls, changing the diameter of the roll.

Each of the tension rolls is similarly constructed and the gears 140 are in mesh. In the upper end of the standard 124, is rotatably mounted a shaft 141, to the outer end of which is secured a crank 142. The inner end of the shaft 141 carries an elongated pinion 143 which meshes with the gear 140 on the upper roll 83. The gear 140 on one of the rolls, here shown as the lower roll, carries a spring actuated locking pin 144 received in a bearing 145 in the gear and the inner end of the pin is adapted to engage with a slot 146 cut on the edge of one of the segment plates 130. When the tension rolls are stationary the operator by pulling out the pin 144 and rotating the crank 142 may, by rotation of the gears 140, expand both of the tension rolls slightly. The gearing and the pitch of the cones is so adjusted that when a single complete rotation of the gears 140 has been made and the pin again enters the slot 146, the change in the size of the tension rolls will compensate for a single layer of fabric.

While the fabric may be rolled into the supply roll with accuracy, it often happens that variations will occur and it is one of the purposes of the machine, to guide the fabric so as to maintain it accurately centered with respect to the core, thereby reducing the width of the fabric which it is necessary to provide and reducing the waste due to the trimming operations.

Carried at a midway point on the shaft 76 is a pointer or indicator 147 which is adjustably held on the shaft between two collars 148, so as to be in line with the center line of the core. The fabric is usually marked with a center line and by keeping the center line of the fabric under the pointer 147, the fabric will be accurately positioned on the core. The roll 84 may be provided with a center line 147ª for the same purpose. Should the fabric not run true, there is provided means by which the tension rollers may be shifted to the right or left to bring the fabric in line.

The shaft 62 of the roller 61 and the shafts 85 and 86 of the rollers 82 and 83 are slidably received in their respective bearings. All of these shafts extend outwardly beyond the standard 125 and are received within a substantially triangular plate 150. On the shafts at either side of the plate are secured collars 151 and on the face of the plate are formed lugs 152, through which passes a pivot pin 153 for a lever 154, the free end of which extends to a point adjacent the core. The lever 154 is fulcrumed on a pin 155 at 157, the pin passing through an aperture 156 in the plate and being mounted in the upright 125. Pins 158 are also secured to the standard 125 and extend through the plate being provided with coil springs 158ª at the sides of the plate which serve to keep it in centralized position.

If the operator observes that the fabric is not running true, he may move the lever 154 which shifts the several rollers and the fabric will be righted. The springs 158 will tend to bring the rolls back to their original position immediately upon relaxation of pressure on the lever 154.

From the tension roller 83 the fabric passes under the bulbed roller 84. The function of this roller is to spread the fabric longitudinally and remove any wrinkles or folds therein. The roller is adjustably mounted so as to be movable towards and away from the core, in order to enable it to be placed in such position that it will function properly.

The shaft 159 of the roller is mounted in the ends of parallel arms 160, which are adjustably held in split clamping sleeves 161, which are secured to a transverse rocking shaft 162 rotatably mounted in bearings in the upper ends of standards 124—125. One end of the shaft 162 carries a worm gear 163 which meshes with a worm 164 secured to a shaft 165 rotatably mounted in bearings 166 on the upper end of standard 125. The end of the shaft 165 is squared for attachment of an operating handle. By this arrangement it will be seen that the roller 84 may be adjusted to any position by sliding adjustment on the arm 160 and by rotary adjustment of the shaft 162.

The roller 84 may be of any preferred shape and may be bulbed as shown in Fig. 18 or may be provided with a centrally located groove 167 as shown in Fig. 3.

*Shaping or spinning rollers.*

The fabric and the outer rubber portions of the tire are shaped and smoothed to the side of the core by a pair of stitching or spinning rollers which are designed to be mechanically advanced toward and from the center of the core, the arrangement being such that the speed of advance may be fast or slow in either direction so as to give greater flexibility to the machine. This capability of the operation is valuable in applying the several parts to the tire.

The shaft 98 is rotated in the manner which has been described at fast and slow speed, and this shaft carries a worm 100 which meshes with a worm gear 168 keyed to a shaft 169 supported in bearings 170 depending from the slide 64. On the shaft 169 is also secured a small pinion 171 and adjacent the pinion is rockingly mounted a bracket 172 on the inner end of which is rotatably mounted a pinion 173 in mesh with the pinion 171. Also mounted on the bracket is a second pinion 174 which is in mesh with the gear 173.

In brackets 175 depending from the bed plate 64 is a shaft 176 to which is secured a gear 177. The gear 177 is arranged so as to be in mesh with either the gear 173 or the gear 174 to advance or retract the stitchers by the adjustment of the bracket 172. The tail or end of the bracket remote from the gears 173 and 174 is provided with a pin 178 which carries a roller 179 arranged to be received in one of three notches 180 cut in the side of a detent lever 181. The lever is pivotally mounted in a bracket 182, the upper end of which is attached to the bed plate. The detent is yieldingly held so as to engage with the roller 178 by a spring 183 one end of which is attached to the upper end of the detent and the other end to the bed plate. A link 184 is carried on the pin 178 and extends downwardly to the base of the machine and is attached at its lower end to a foot treadle 185, pivoted in a bracket 186 attached to the base of the machine.

Now by operation of the foot treadle the bracket 172 may be moved so as to be in neutral or non-driving position or in forward or reverse, whereby the stitchers may be advanced or retracted, which, in combination with the two way rotation of the core and the two speed mechanism for the core makes an extremely flexible machine.

The shaft 176 carries two pinions 186 which mesh with gears 187 supported on stub shafts 188 suspended from the under side of the bed plate and these gears project through the bed plate and mesh with racks 189 attached to the underside of a sliding plate 190 which carries the stitching devices.

The plate 190 is slidably mounted on the bed plate 64 between rails or guideways 191 being held in place by two overhanging strips 192. The stitcher carriage comprises the lower plate 190 and an upper or cover plate 193 to which it is attached by bolts 194, spools 195 being used to hold the plates in proper spaced relation. Between the two plates are arranged pivots 196 on which are carried two parallel spaced arms 197 and 198. At the sides of these arms are pivotally carried two spaced arms 199 and 200, the outer ends of which are provided with pivots 201 on which the stitching or spinning rolls are carried.

The arms described are held so as to normally lie side by side, but a slight yielding movement is permitted by pins 202 which are connected to the outer arms and project through the inner arms being provided with coil springs 203 which allow the spinning arms to give slightly as in passing over a splice or other obstruction on the tire.

The outer end of the arm 198 carries a pin 204 which is received within a slot formed on the end of a rack 205 slidably mounted in the lower plate 190. The inner end of the arm 197 carries a pin 206 which is received in a slot formed on the end of a rack 207, slidably mounted in the plate 190. The racks 205 and 207 are parallel and are engaged by pinions 210 both secured to a rock shaft 211 mounted in bearings 212 on the plate 190. A handle 213 is formed on the end of the shaft 211 and by operation of this handle the stitcher carrying arm may be simultaneously opened and closed in going around the tire.

Each stitcher comprises a disk 214 mounted on ball bearings 215 on the ends of a pin 216, projecting from a bearing plate 217 freely pivoted on the center 201. The bearing plate 217 carries a lateral extension 218 which is provided with a recess in which is seated a coil spring 219. Also pivoted on the center 201 is second plate 220 against the side of which the spring 219 is arranged to bear. It will be noted that the faces of the parts 217 and 220 meet or contact opposite the pivot while they diverge slightly at the outer ends where the springs 219 are located. The springs normally tend to hold the parts in the position shown in Fig. 11 but in case the roller strikes an obstruction on the tire such as a splice or the like either stitcher may give slightly without affecting the other stitcher.

Each plate 220 carries a pin 221 to which is pivoted an adjustable link 222 which links extend backwardly along the arms 199 and 200 and are pivotally connected at 223 with fan-shaped rocking sectors 224 journalled on the pins 196. The sectors 224 are pivoted in the links 197 and 198 and are provided with intermeshing gear teeth 225.

On one of the plates 220, preferably to one nearest operator, as he stands on the right hand side of the machine, is secured an outwardly projecting pin 226 on which is slidably mounted a locking handle or knob 227 arranged to be pressed inwardly by a spring 228. The inner face of the handle is provided with a plurality of teeth 229, which are adapted to engage a number of teeth 230 formed on an extension projecting from the side of the arm 200. When the operator desires to change the angle of the stitching roller relative to the work as in stitching the fabric under the bead, as shown in Fig. 9, he pulls out the knob 227, shifts the stitcher to the proper angle and then locks the arm in place by releasing the knob. The links 222 and the geared sectors 224 communicate a similar change in the position of the other stitcher.

It will be seen from the description that a great degree of flexibility is provided for the stitchers. They may be fed forwardly and backwardly by operation of the foot treadle 185 with the corresponding adjustment of the arm 172. They may be adjusted transversely of the core to enable them to pass around the core by manipulation of the arm 213, which arm is also used to regulate the pressure of the rollers during the stitching operation. The arms 199 and 200 are adapted to yield transversely of the arms 197 and 198, without affecting the pressure applied upon the lever 213, and in addition each of the rollers may yield slightly by pivotal action of the plate 217 on which it is journalled.

Provisions are also made for manually advancing or retracting the stitchers when the driving mechanism is in neutral position. The end of the shaft 176 projects beyond the right hand gear 186 and supports a loose sleeve 231 and a sprocket 232. The sleeve 231 is formed with an arm 233 the lower end of which is split to receive and clamp an eccentric bearing 234 in which is mounted a shaft 235, which projects outwardly from the bearing 234 and carries a sprocket 236. Over the sprockets 232, and 236 is a chain 237, the adjustable eccentric bearing serving as a means for tightening the chain. To the sprocket 236 is secured a gear 238 which meshes with a pinion 239 attached to the shaft 240 of a hand wheel 241. Between the shaft 235 and the shaft 240 is a swinging arm or link 242. The shaft 240 of the hand wheel is carried in a bracket 243 secured to a transverse web 244 of the standard 66. Rising from the bed plate 64 at the rear of the sliding carriage supporting the stitching rollers are two lugs or projections 245 in which are seated bumper springs 246 which serve to break the return movement of the stitcher carriage. The front of the upper and lower plates constituting the stitcher carrier are cut away as at 247 so as to embrace the tire casing and permit advance of the stitcher.

*Tread rolling device.*

The machine shown herein is intended to be used for applying the outer rubber portions to the carcass, and in applying the tread it is necessary that the part be rolled down firmly upon the tire. To perform this function, there is mounted on the base plate, a cylinder 248, the plunger of which is formed with a fork 249 in the outer end of which is journalled a concave roller 250. While the tire is being built up the tread roller is withdrawn. After the tread has been applied, pressure from any suitable source and controlled in any suitable way, is admitted to the cylinder and the roller is projected forwardly, while the core is rotated and the tread will be firmly rolled into place upon the tire.

*Summary.*

It will be observed from the description of the machine, that while it is not automatic in the sense that the operations of tire building take place without human intervention or assistance, the machine is highly valuable in assisting in the building of tires, being capable of operation in the numerous steps of building a tire. It has proven especially valuable in the manufacture of pneumatic tires of large cross section, up to 10 inches, and has materially reduced the time of building such tires.

The machine is first adjusted to the size tire which it is intended to build by operation of the shaft 70 which brings the proper gear of the set 97 in line with idler 92 which has been adjusted by the slide 94. The fabric is led over 61, 82 and 83, the roller 74 resting upon the fabric and serving to maintain a tight frictional contact with the roller 61. The forward end of the fabric is stuck to the core and the clutch 106 shifted to the left of Fig. 22 by the lever 118 or 113 to connect the stretching rollers with the driving mechanism. The core is now started in slow rotation in either direction by pressure applied to any one of the levers 46, 47, 51 or 52. The gear 97 is so calculated with the other driving mechanism for the stretching rollers as to rotate the stretching rollers at a predetermined slower speed than the speed of the core to impart the desired degree of stretch to the fabric. As each layer of fabric is placed upon the core, an additionally greater circumference is obtained and in order to compensate for this the crank 142 is operated after each application of fabric to increase the circumference of the stretching rollers to pay off a slightly greater amount of fabric to compensate for this difference. As the fabric passes the core it is curved transversely by the roller 84 which removes the longitudinal folds or wrinkles therein. The operator guides the fabric by manipulation of the lever 154 so as to center it to the core.

In passing from this portion of the description it will be noted that the adjustment of the bed plate 64, not only brings the proper gear of the group 97 into proper relation, but also brings the standard 55, the tension rollers, roll 84 and the stitchers at the proper distances from the chuck, depending upon the size of the core.

When the layer of fabric has been applied and the end separated from the other fabric, the ends of the fabric on the core are connected together and the core is ready for the spinning operation.

The clutch 106 is now disconnected and the driving mechanism is connected to the high speed drive by the levers 36 or 36ª, the mechanism being such that the core may be rotated in either direction at the will of the operator. The arm 172, which has been in neutral position is now rocked by actuation of the foot lever 185 to bring the gear 173 in mesh with the gear 177. At the same time the operator moves the hand lever 213 to spread the spinning rollers 214 until they are at their proper position. The spinning rollers, which for the major portion of the spinning operation are in the position shown in Fig. 11, are now advanced forwardly, the side pressure of the rollers being governed by the lever 213. During the spinning operation the springs 203 and 219 exert a yielding pressure on the rolls allowing them to give slightly in unison or individually according to the character of the work.

When the spinning of each ply has been completed the operator spreads the rollers and withdraws them by throwing the arm 172 in neutral and using the hand wheel 241 or by throwing the arm 172 in reverse, which meshes the pinion 174 with the gear 177. At any time during the operation of spinning the operator may go back over any portion of the tire by either method.

After the beads have been applied, in any well known manner, the angle of the rollers 214 to the plane of the core may be adjusted as shown in Fig. 9 to stitch under the beads, the gears 224 moving the rollers in unison, so that they may both be operated from the right hand side of the machine.

In folding the plies of fabric back over the beads, if such a tire construction is to be made, the stitching rollers are moved in the reverse direction in the manner indicated.

After the carcass is complete, the tread and sidewalls may be applied, the central portion of the tread being rolled down by roller 250 and the other parts being rolled into place by the stitching rollers.

It will be seen that the operator has the utmost control over the parts of the machine.

From any position about the core, he can stop, start or reverse the machine or change the speed of rotation of the core. He can also connect or disconnect the stretching rollers in the same way. The spring rollers are under his complete control both as to position, direction and speed of movement, and angular relation to the core from the right hand side of the machine.

While the description and drawing are detailed throughout, it will be obvious that, upon an understanding of the principles of the invention, the same may be embodied in variations and modifications of the machine and such as fall within the scope of the invention and the claims annexed hereto are intended to be covered herein.

Claims:

1. In a machine for making tires, a core, means for rotating the core, a tension roller, gearing connecting the tension roller with the core so as to rotate it at a surface speed less than the surface speed of the core, means within the gearing to change the relative speed of rotation of the core and the roller and means to expand and contract the core.

2. In a machine for making tires of different diameters, a rotating core support, a tension roller and means for governing the surface speed of the tenson roller so that it is less than the surface speed of the core, said means comprising a basic speed regulating device for the various size tires and a secondary speed regulating device for compensating for the increasing thickness of a tire during the building process.

3. In a tire making machine, a core holding and revolving stand, a carriage movable toward and away from the stand, fabric feeding and tension rolls on the stand, positive gearing for driving the tension rolls, including differential gears and a driving gear, said differential gears being movable into driving relation with the driving gear upon adjustment of the carriage.

4. In a tire making machine, a core chuck, a carriage adjustably movable toward and away from the carriage, a plurality of differential gears on the carriage and a single driving gear adapted to mesh with each of the gears on the carriage, a tension roller for the fabric, said gears being adapted to drive the tension roller.

5. In a machine for making tires, a tension roller, a core and means for rotating said core and tension roller from a common driving means, changeable gears in said tension roller driving means, means for moving said tension roller toward and away from the core, said gears being so mounted as to be changed upon such movement.

6. In a machine for making tires, a tension roller, means for driving said tension at different speeds and common means for bodily moving said tension roller and varying the speed of said tension roller driving means.

7. In a machine for making tires, a core, a carriage movable toward and away from the core, a tension roller on the carriage, a plurality of differential gears for driving the tension roller, the movement of said carriage bringing the said differential gears into effective driving relation to the roller.

8. In a machine for making tires, a core, a tension roller, a movable support for bringing said tension roller at various stations toward or away from the axis of the core, variable speed devices for driving the tension roller, the variations in speed taking place at each movement of the roller to a station.

9. In a tire making machine, a fixed support and a movable carriage on said support, a single gear on one of said members, and plurality of differential gears on the other member, adapted to mesh with said gears, a tension roller on one of said members, a core on the other member and means for driving the core and the tension roller from said gears.

10. In a tire making machine, two tension rollers, means for connecting the two said rollers together for rotation and means for expanding said tension rollers in unison.

11. In a tire making machine two parallel shafts means for connecting said shafts for rotation, tension rollers on said shafts, said tension rollers being variable in circumference and means for simultaneously expanding or contracting the rollers.

12. In a tire making machine, two parallel expansible tension rollers and a single operating means for simultaneously expanding said rollers.

13. In a tire making machine, two parallel segmental tension rollers, expanding devices within the rollers, means connected with each expanding device to operate same, and interconnection between each operating device to move them in unison.

14. In a tire making machine, two parallel segmental tension rollers, expanding cones within said rollers, screws to move said cones, a gear attached to each screw and means to operate said gears in unison.

15. In a tire making machine, two parallel segmental tension rollers, gears at one side of said rollers to rotate them, expanding devices within said rollers and gears at the other side of said rollers to operate the expanding devices in unison.

16. In a tire making machine, a roller over which the fabric passes on its way to the core, the shaft of the roller being slidable in its bearings, and lever mechanism under control of the operator for moving the shaft longitudinally to center the fabric relative to the core during its passage over the roller.

17. In a tire making machine, a series of tension rollers over which the fabric passes on its way to the core, the shafts of said rollers being slidable in their bearings, and lever mechanism under control of the operator for moving the rollers transversely of the fabric to center it relative to the core during its passage over the rollers.

18. In a tire making machine, a roller over which the fabric passes to the core, the shaft of the roller being slidable in its bearings, a lever pivoted adjacent the roller and extending to a position at the side of the core, and connections from the lever to the roller to move the latter during the passage of the fabric to the core.

19. In a tire making machine, a plurality of tension rollers, means to shift the tension rollers transversely of the fabric, and yielding means to maintain the rollers in fixed position.

20. In a tire making machine, a spinning roller, a sliding carriage for supporting the spinning roller, a movable arm, two oppositely rotating driving devices on said arm and means for moving said arm to bring either of said devices in operative connection with the carriage.

21. In a tire making machine, a spinning roller, a sliding carriage for supporting the spinning roller, a movable arm, two oppositely acting driving devices on said arm and means for holding said arm in inoperative position or with either of said devices in operative relation to the carriage.

22. In a tire making machine, a spinning roller, a sliding carriage for supporting the spinning roller, a movable arm, two oppositely acting driving devices on said arm, means for holding said arm in inoperative position or with either of said devices in operative relation to the carriage, and manually operable means for moving said carriage when the said arm is in inoperative position.

23. In a machine for the manufacture of tires, the combination of a sliding carriage, a pair of arms pivoted on the carriage, racks pivoted to said arms, a common actuating shaft for the racks, spinner carrying arms pivoted to the first-said arms, springs to yieldingly hold the respective arms together, a pivoted stitcher at the end of each spinner arm, a plate pivoted with each stitcher but yieldingly connected thereto, a link along each stitcher arm, and intermeshing sectors connected to the two links.

24. In a machine for the manufacture of tires, the combination of a sliding carriage, a pair of arms pivoted on the carriage, means to rock said arms about their pivots in unison, stitcher carrying arms pivoted to said first named arms and yieldingly held in relation thereto, pivoted stitchers at the ends of the stitcher arms, a plate also pivoted to the ends of each of the stitcher arms, and means to yieldingly connect the plates and the stitchers and positively connect the plates to one another.

WILLIAM C. STEVENS.